Aug. 1, 1939.   N. J. MARSHALL   2,168,132
TRAP
Filed Aug. 11, 1937   2 Sheets-Sheet 1
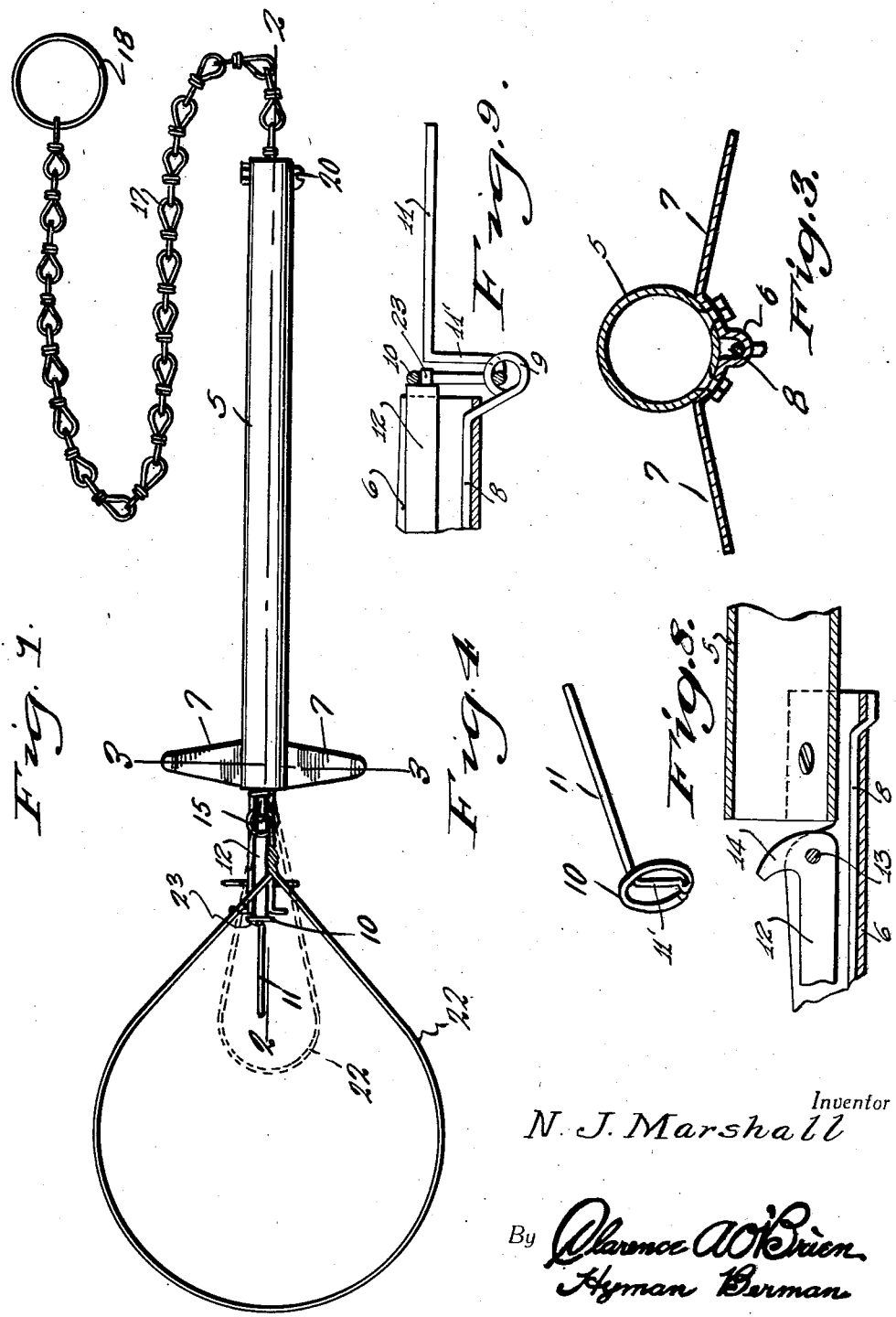
Inventor
N. J. Marshall
By Clarence A. O'Brien
Hyman Berman
Attorneys Aug. 1, 1939.  N. J. MARSHALL  2,168,132
TRAP
Filed Aug. 11, 1937  2 Sheets-Sheet 2
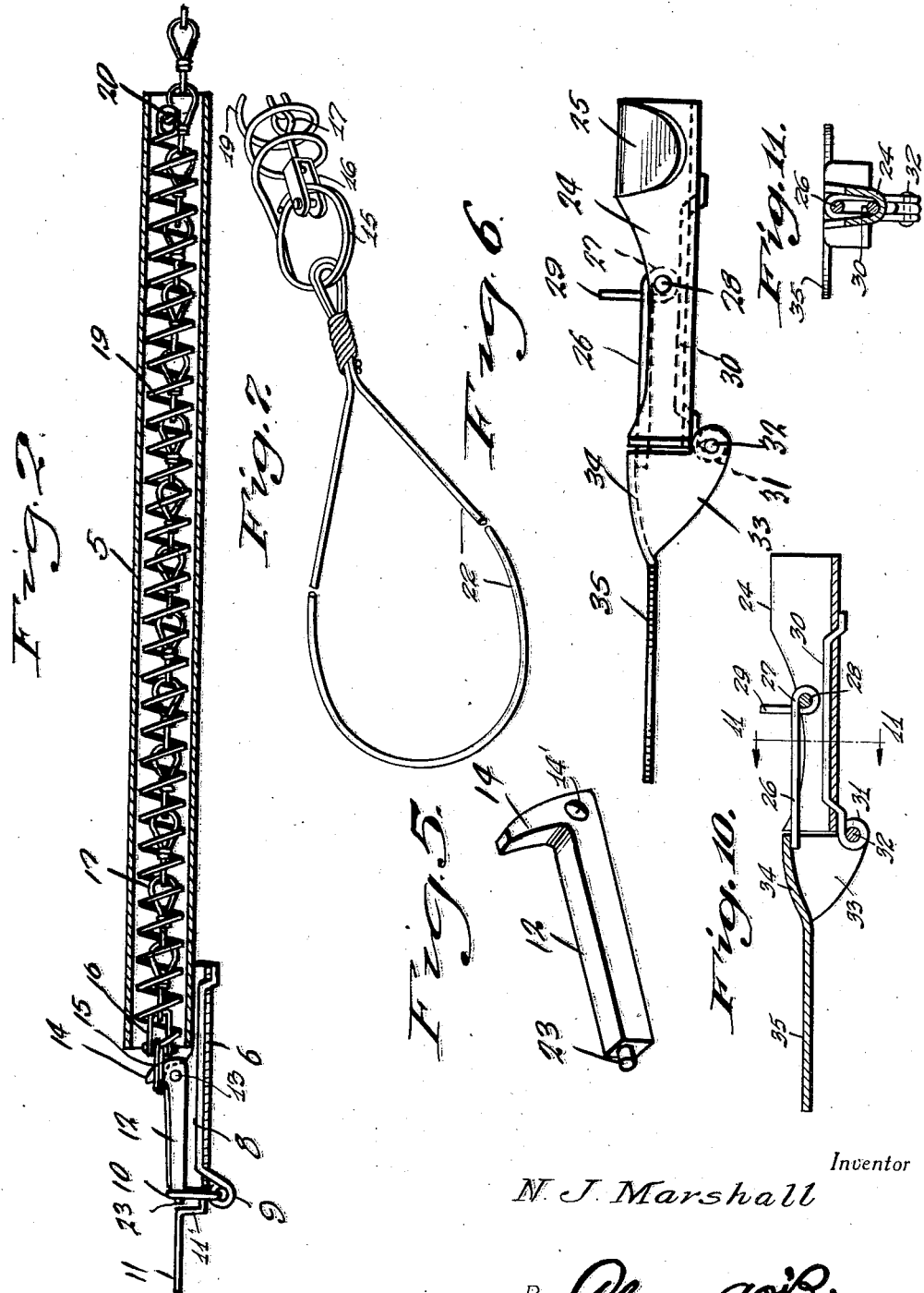
Inventor
*N. J. Marshall*
By *Clarence A. O'Brien*
*Hyman Berman*
Attorneys Patented Aug. 1, 1939

2,168,132

UNITED STATES PATENT OFFICE 2,168,132

TRAP

Nick J. Marshall, Sidney, Ohio

Application August 11, 1937, Serial No. 158,574

2 Claims. (Cl. 43—87)

This invention appertains to new and useful improvements in the general art of trapping and more particularly a novel form of snare.

The principal object of the present invention is to provide an improved trap of simple construction yet which in operation will effectively serve to hold an animal until he has been acquired by the trapper.

Another important object of the invention is to provide a trap of the kind stated which will not be susceptible to the ready development of defects.

These and various other important objects and advantages of the invention will become apparent to the reader of the following specification.

In the drawings:

Figure 1 presents a top plan view of the trap.

Figure 2 is a fragmentary longitudinal sectional view, the section being taken on line 2—2 of Figure 1.

Figure 3 is a cross section on line 3—3 of Figure 1.

Figure 4 is a perspective view of the bait holder.

Figure 5 is a perspective view of the trigger.

Figure 6 is a side elevational view of the trigger and trigger plate modified.

Figure 7 is a perspective view of the front end of the spring, a portion of the chain and the snare loop.

Figure 8 is a vertical sectional view of the front end of the tubular member, a portion of the shank and a part of the trigger.

Figure 9 is a vertical sectional view through the front end of the shank and showing how the bait member is swivelled to the shank by the wire carried by the shank and having the eye at its front end for receiving the loop of the bait member, this view also showing how the trigger member engages the loop of the bait member.

Figure 10 is a longitudinal sectional view through the modification shown in Figure 6.

Figure 11 is a section on the line 11—11 of Figure 10.

Referring to the drawings wherein like numerals designate like parts, it can be seen that the trap consists of an elongated barrel 5 having the shank 6 projecting beyond one end thereof from the bottom side of the barrel 5 and laterally from said shank 6 extend the wing members 7—7 to steady the trap barrel on the ground or against a tree, or wherever the trap happens to be set. This shank is of channel shape and its rear end is bolted to the front end of the barrel 5, as shown in Figure 3.

A wire member 8 has its major portion engaging the bottom of the channel formed by the shank 6 and has one end disposed through an opening in one end of the shank 6 and its other end is disposed through an opening in the opposite end of the shank and then coiled to form the eye 9 through which the loop 10 is disposed. This loop 10 is part of the bait holder and is shown in Figure 4. The bait holder is constructed of one single strip of said wire, the same being shaped to form the aforementioned loop 10 and the outwardly extending bait carrying arm 11, said arm 11 having a downwardly bent portion 11', the lower end of which is connected with the bottom part of the loop 10.

Numeral 12 represents the trigger arm which is formed with a hook portion 14 at its rear end, the major part of the arm being located in the channel formed by the shank 6 and the arm is pivoted to the shank by a pin 13 which passes through the flanges of the channel-shaped shank 6 and through a hole 14' in the arm adjacent the rear end thereof. A spiral spring 19 is located in the barrel and has its rear end looped over a bolt 20 which passes through the rear end of the barrel and the front end of the spring forms a ring 15 which is adapted to engage the hook 14 of the trigger arm and a clevis 16 engages the ring 15 and has a chain 17 connected therewith, said chain passing through the spring and beyond the barrel, as shown in Figure 1 and having a ring 18 connected with its rear end, this ring 18 being adapted to be connected in any suitable manner to a stationary object to prevent an animal caught in the trap running off with the trap. A snare loop 22 of wire or the like has its rear end formed with a small loop through which the ring 15 passes as shown in Figure 7. The front end of the trigger arm 12 has a pintle 23 thereon for engagement with the bait loop 10 as shown in Figures 2 and 9.

In setting the trap, bait is placed on the arm 11 and the ring 15 is placed over the hook 14, which extends the spring 19 and then the loop 10 of the bait member is placed over the pintle 23 of the trigger arm which holds the parts in the position shown in Figure 2 with the spring 19 stretched.

Obviously when the arm 11 is depressed by an animal attempting to acquire the bait, the loop 10 will be released from the pintle 23. This will free the spring 19 from the trigger foot 14 and result in the drawing of the loop 22 quickly into the barrel 5.

A modified form of trigger structure is shown in Figures 6, 10 and 11 wherein a channelled structure 24 corresponding to the shank 6 in Figure 2 and the wing members 25 project laterally therefrom. Between the side walls of the channelled structure 24, a trigger 26 is provided, this trigger being formed into the barrel 27 and through this barrel is disposed the pivot pin 28 disposed through the side walls of the channelled structure 24. The trigger 26 is provided with the upstanding lug 29 which is engageable with the ring 15 aforementioned.

The wire 30 has its ends disposed through openings in the bottom of the channelled structure 24, one of these end portions being further formed to provide a barrel 31 through which the pin 32 is disposed, this pin also being disposed through the openings of the depending ears 33 which are formed by the depending side parts of an inverted loop portion formed on the shank 34 of the treadle plate 35. The free end portion of the trigger 26 is engaged under the shank 34 when the trap is set.

Obviously in this form of the trap the treadle plate is usually concealed in a runway of an animal and the animal steps on the plate as it passes along said runway. The snare loop 22 will usually catch a leg of an animal though in some cases, particularly where bait is placed on the arm 11 the loop might catch the head of the animal as it attempts to eat the bait.

While the foregoing specification sets forth the invention in specific terms, it is to be understood that numerous changes in the shape, size and materials may be resorted to without departing from the spirit and scope of the invention as claimed hereinafter.

Having thus described the invention what is claimed as new is:

1. In a trap structure, an elongated member, a spring extending longitudinally of said member and having one end anchored to said member and the other end provided with a loop, a rockable trigger mounted on one end of said member, said trigger being provided with a pintle, said member being provided with a shank, an elongated element carried by the said shank, said element being provided with an eye, and a trigger release member carried by said eye, said trigger release member comprising a loop and a part for actuation by an animal, said last-mentioned loop being disposed over said pintle.

2. A trap of the class described comprising an elongated tubular member, a spiral spring having one end connected with the rear end of the tubular member, the spring passes through the tubular member and having a loop at its other end, a channel-shaped shank extending from the front end of the tubular member, a trigger member pivoted in the shank and having a hook at its rear end for engagement with the loop of the spring, the front end of the trigger member projecting from the channel of the shank, a member pivoted to the front end of the shank and adapted to be actuated by an animal, said last-mentioned member having a loop at its inner end for passing over the front end of the trigger member to hold the trap in set position, and a snare loop connected to the front end of the spring.

NICK J. MARSHALL.